March 1, 1949. A. VANDERVELD 2,463,128
DISPLAY CASE CONSTRUCTION
Filed Oct. 12, 1946 5 Sheets-Sheet 2

INVENTOR
ANTHONY VANDERVELD
BY Liverance and
Van Antwerp
ATTORNEYS

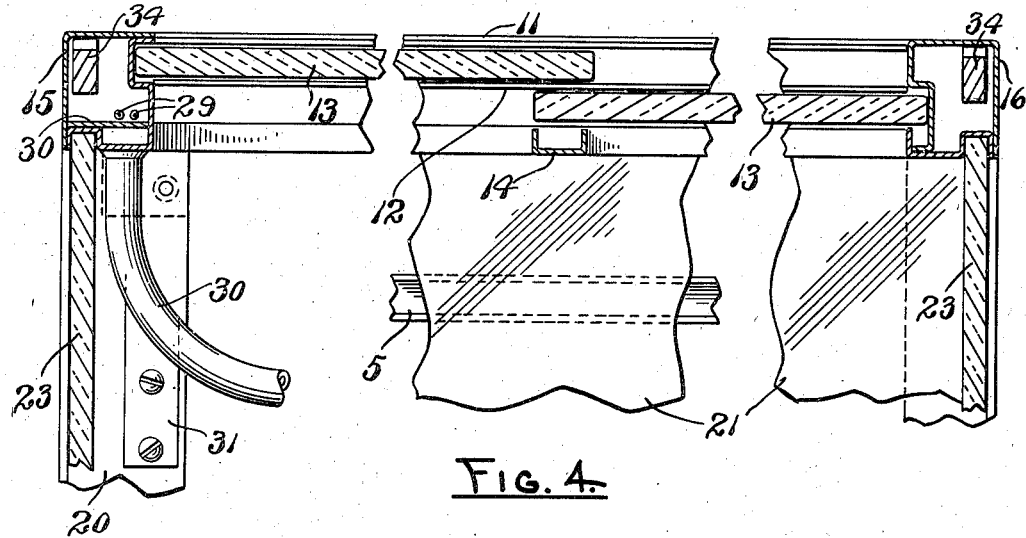
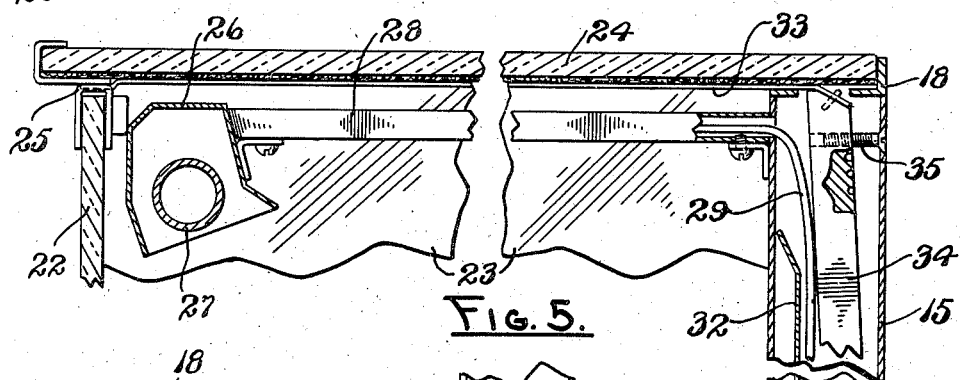
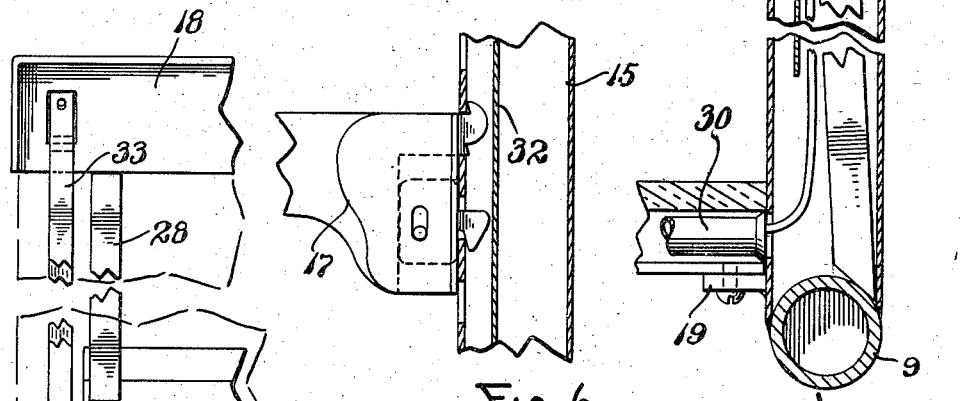
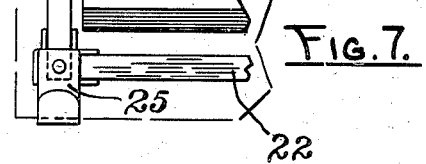

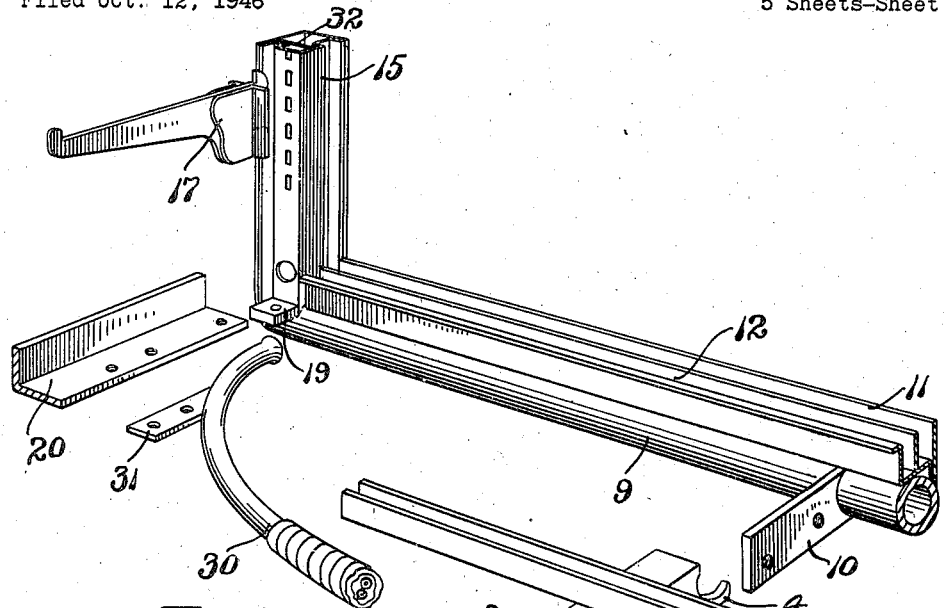
Fig. 8
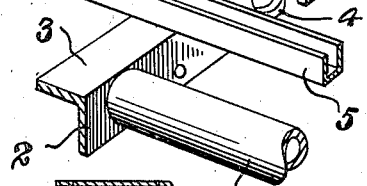
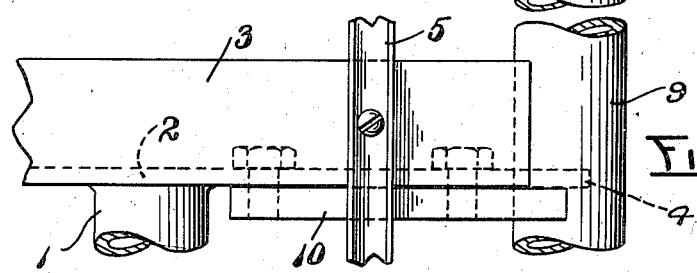
Fig. 9.
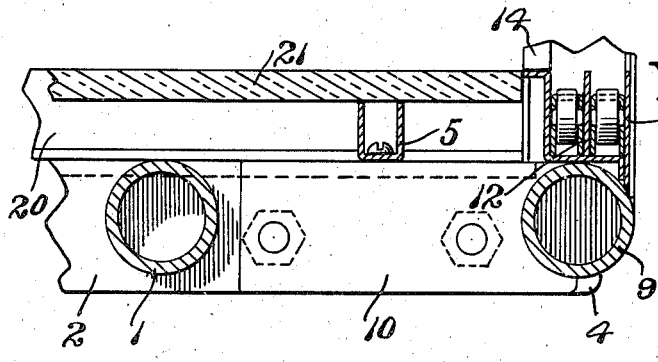
Fig. 10.
INVENTOR
ANTHONY VANDERVELD
BY Liverance and Van Antwerp
ATTORNEYS

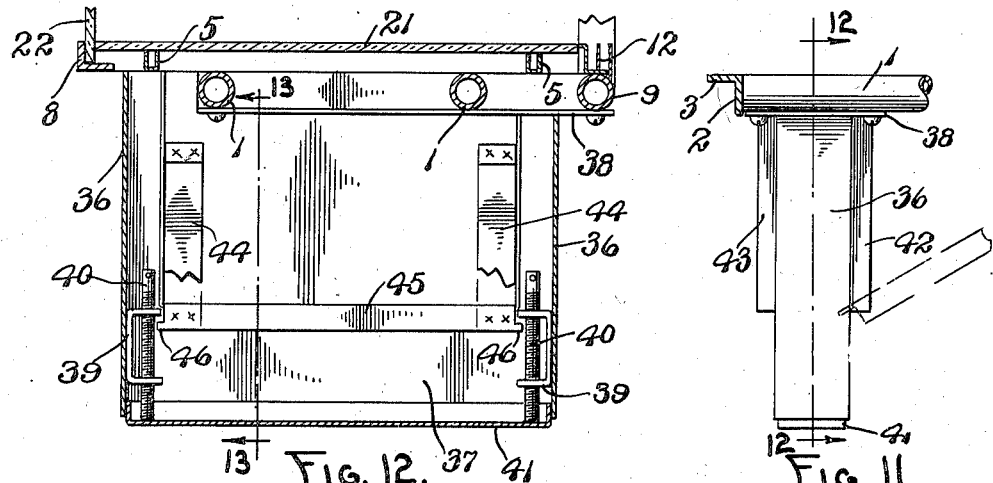
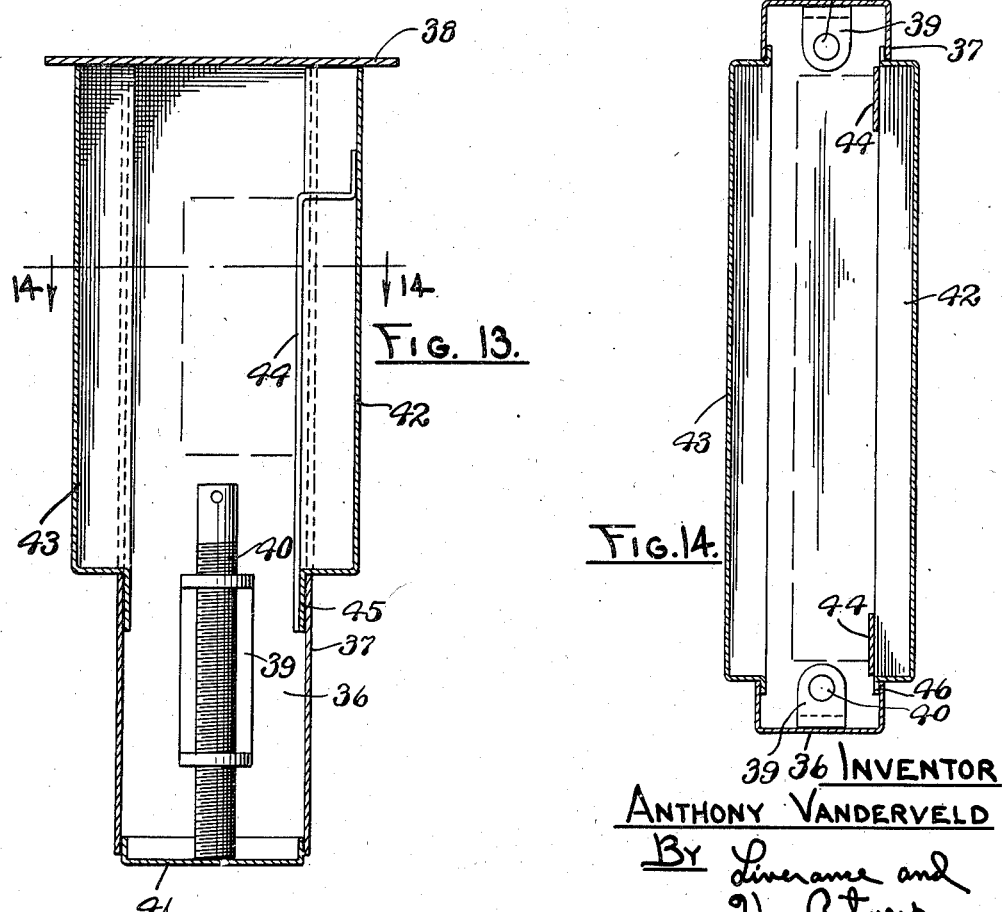

Patented Mar. 1, 1949

2,463,128

UNITED STATES PATENT OFFICE 2,463,128

DISPLAY CASE CONSTRUCTION

Anthony Vanderveld, Grand Rapids, Mich., assignor to Grand Rapids Store Equipment Company, Grand Rapids, Mich., a corporation of Michigan Application October 12, 1946, Serial No. 703,063

13 Claims. (Cl. 312—114)

The present invention relates to a show or display case construction in which the superstructure is of glass through which merchandise held within the case may be readily seen, structural elements which interpose in the path of vision through the glass being eliminated. In structures of such character the connections of glass plates forming the front, ends and top of the case, are of little strength so far as resisting change of position and it is very desirable that the base structure shall be of a particularly sturdy and rigid construction, not subject to deformation in use, so that the glass superstructure will at all times remain in its proper position. The back of the case, through which access is had to the interior for placing merchandise therewithin or removing it therefrom, likewise should be of a rigid structure not subject to warping or other deformation getting it out of shape, and its connection to the base or bottom structure of the case likewise should be one of maximum strength and durability. At the same time the construction used must be light and not massive in any degree, readily handled and resistent to change in form, whether in moving or in the service to which the show case is subjected in use.

The present invention of show case accomplishes the ends stated in a particularly practical, useful and economical manner. The entire case is made from metal and glass with no parts or members of wood. It is light in weight and exceptionally strong and resistant to change in form, and may have readily applied and used therewith a modern system of lighting for the interior of the case using fluorescent lighting tubes and the electrical transformer required therewith, which is carried by the base of the case structure. Also with the novel structure which I have produced, adjusting means may be used, workable from the back of the case for properly adjusting and positioning and holding the front, end and top glass plates of the case in their desired vertical and horizontal positions and in their proper positions and relations to each other.

An understanding of the invention may be had from the following description, taken in connection with the accompanying drawings, in which Fig. 1 is a perspective view of an "all-glass" show case in which my invention is used.

Fig. 4 is a fragmentary horizontal section, with parts broken away substantially on the plane of line 4—4 of Fig. 1.

Fig. 5 is a fragmentary vertical section similar to Fig. 2, but with the section near an end of the case, of the upper and back portions of the show case.

Fig. 6 is a fragmentary somewhat enlarged vertical section and elevation illustrating a back end post and the shelf supporting bracket used therewith.

Fig. 7 is a fragmentary plan view of one end of the show case structure with the top glass removed.

Fig. 8 is a fragmentary perspective view of elements of the base and back frame structure disassembled.

Fig. 9 is a fragmentary horizontal section and plan at one end of the base structure, substantially on the plane of line 9—9 of Fig. 3.

Fig. 10 is a fragmentary vertical transverse section of such base structure and lower part of the show case, substantially on the plane of line 10—10 of Fig. 3.

Fig. 11 is an end view of a supporting leg structure for the show case, two being used.

Fig. 12 is a vertical section therethrough, substantially on the plane of line 12—12 of Fig. 11.

Fig. 13 is an enlarged transverse vertical section, substantially on the plane of line 13—13 of Fig. 12, and Fig. 14 is a horizontal section, substantially on the plane of line 14—14 of Fig. 13.

Like reference characters refer to like parts in the different figures of the drawings, and the section lines are taken in the directions indicated by the arrows associated with the several section line planes.

Figure 2:
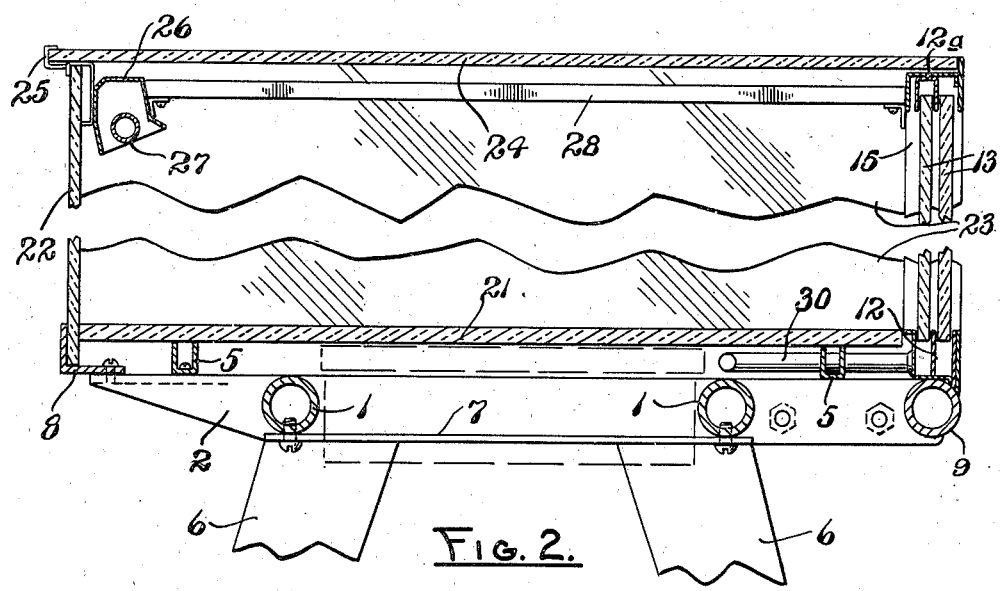
Fig. 2 is a vertical section from front to rear of the show case structure shown in Fig. 1, substantially on the plane of line 2—2 of Fig. 1.
Figure 3:
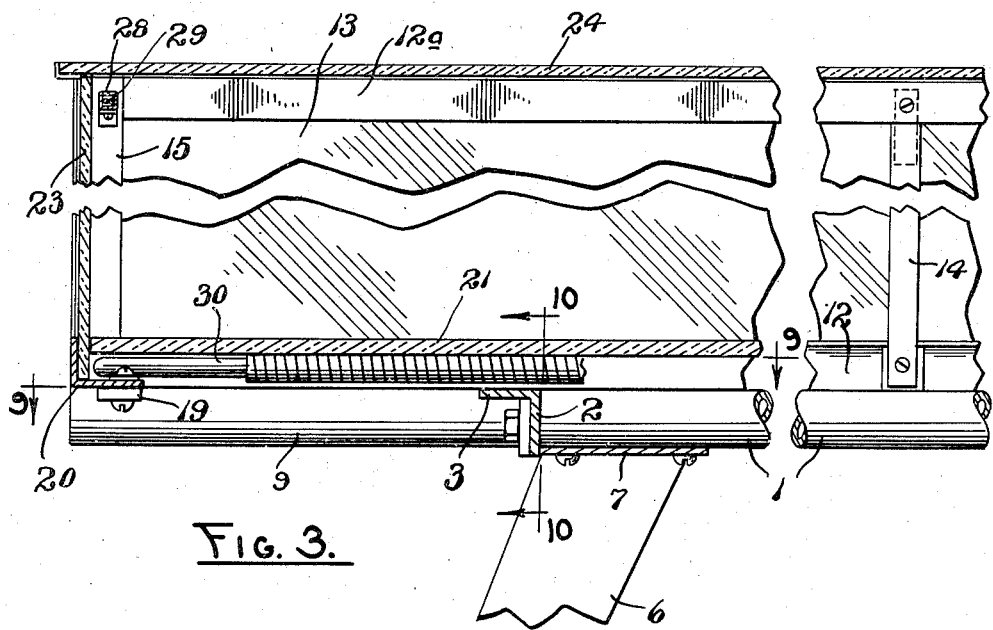
Fig. 3 is a similar longitudinal section substantially on the plane of line 3—3 of Fig. 1.

In the structure illustrated, two spaced horizontal metal tubes 1, of a length less than the over all length of the show case, are welded at their ends to vertical flanges 2 of two transverse bars, each having horizontal upper flanges 3 extending away from the ends of the tubes. Said flanges 2 of the angle bars at their rear ends (Fig. 8) are formed with hooks 4 adjacent their lower edges, the upper sides of which are of a concave shape. The front end portions of the angle bars extend nearly to the front of the show case, as shown in Fig. 2, the vertical flanges progressively narrowing in width toward the front ends of said angle bars. At the upper sides of the horizontal flanges 3 longitudinal channel bars 5 are secured by screws or equivalent fastenings, one being located in front of the front tube and the other to the rear of the rear tube. As one means of supporting the frame structure described at a distance above a floor or other support, two pairs of supporting legs 6 are used, the upper ends of each pair having a welded connection to a horizontal plate 7 which bridges the space between the tubes 1 adjacent the ends thereof (Fig. 3), the plates 7 being connected to tubes 1 by screws as shown, said legs preferably diverging downwardly and outwardly away from each other. An angle bar 8 having a vertical outer flange and a horizontal lower flange of the length of the completed show case is screw connected to the forward end portions of the horizontal flanges 3 of the frame angle bars described. Such front horizontal angle bar 8 provides a support for the front glass plate of the show case which rests thereon at its lower edge.

The back frame of the show case includes a third tube 9 of a length substantially equal to the show case length, from which two metal plates 10 extend in a forward direction, said plates at their rear ends being shaped to fit the tube 9 and having a welded connection thereto. The plates 10 are located so that they will come at the outer sides of the vertical flanges 2 of the angle bar frame members, the tube 9 resting upon the two supporting hooks 4 and being held therein while a secure connection of the plates 10 to the flanges 2 are made by bolts passed therethrough. At the upper side of the elongated tube 9 channel guides for sliding doors for the back of the case are welded, consisting of a rear elongated vertical thin plate 11 and other guide members 12 formed with two spaced apart channels for the reception of carriers (shown in Fig. 10) against which the lower edges of overlapping sliding glass doors 13 at the back of the case rest.

Figure 1:
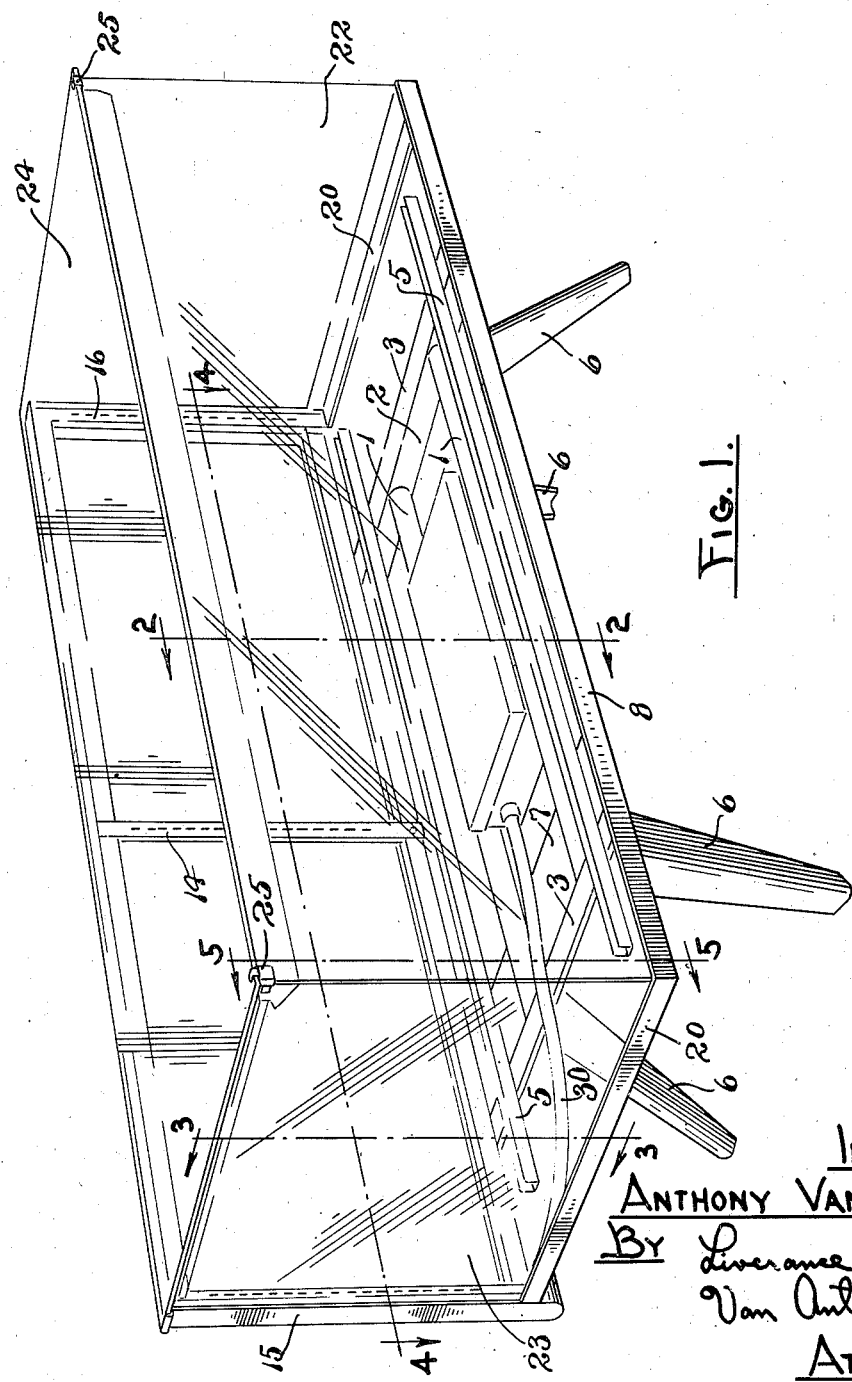

Complementary upper guides 12a for the upper edges of the doors 13, are spaced the necessary distance above the lower guides 12. An intermediate vertical post 14 of channel form (Figs. 1 and 3) and vertical hollow end posts 15 and 16, the end posts connected by welding at their lower ends to the tube 9 and the intermediate post 14 connected at its lower end to the lower guides 12 and all of the posts at their upper ends to the upper door guide 12a, complete the back vertical frame in which the doors 13 are movably carried. The posts 15 and 16 (Fig. 4) are made of sheet metal, properly shaped at their inner sides to receive the outer vertical edge portions of the doors 13 when the doors are positioned to close the back opening. At their front sides they are formed with grooves for the reception of the end plates 23 and the rear posts 14, 15 and 16 at their front sides have the usual vertically spaced slots used in connecting shelf carrying brackets 17 adjustably thereto at desired places in the vertical length of said posts. Such shelf supporting brackets and the way in which they are connected to the posts is old and well known and is not novel in the present disclosure.

At the upper ends of the several posts 14, 15 and 16, a horizontal angle bar 18 is provided for the reception and support of the rear portion of the top glass plate of the show case. A lug 19 is welded at the lower end and front side of each of the posts 15 and 16 (Fig. 8). End horizontal angle bars 20 are connected at the rear ends to said lugs, and are extended forward to meet the ends of the front bar 8, being integral therewith. A horizontal bottom plate 21 for the show case rests upon the bars 5 previously described. Between its front edge and the vertical flange of the front bar 8, the lower edge portion of the front glass plate 22 is received, the lower edge of said plate resting upon the horizontal flange of the front bar 8. Between its end edges and the vertical flanges of the end angle bars 20, the lower edge portions of end glass plates 23 are located, the lower edges of the end plates resting upon the horizontal flanges of the end bars 20. A horizontal top glass plate 24 covers the upper side of the case and at the front corners where the several plates 22, 23 and 24 come together, they are held by metal clips 25 against separation from each other. Such manner of connecting the front, end and top glass plates of a show case is old and well known.

In the upper portion of the show case, immediately back of the front 22, a housing and reflector 26 is supported by means of clips hooking over the upper edge of the front 22, and within it, above the open lower side of the housing, fluorescent lighting tubes 27 are mounted. A tube 28 substantially square in cross section is connected by bracket connection (Fig. 5) at its front end near each end of the housing 26 and extends rearwardly, said tubes at their rear ends, by other bracket connections, being secured to the front sides of the posts 15 and 16. Electrical wires 29 lead from the lighting tubes 27 through the tubes 28 and downwardly through the posts 15 and 16 and are carried through a suitable conduit 30 to a transformer which is used to step up the voltage in fluorescent lighting circuits. The transformer is shown in dash lines in Fig. 2 (not numbered) as supported by the base frame structure underneath the show case floor 21. The conduit or armour 30 for the electric wiring has a flat plate 31 (Fig. 8) welded thereto which is bolted to the adjacent flange of the end angle bar 20. It is, of course, to be understood that suitable openings in the back of the housing 26 and the fronts of the posts 15 and 16 are provided for wire passage. To protect said wires from contact with and possible damage from the inner ends of the hooks of the brackets 17, shown in Fig. 6, a guard plate of sheet metal 32 is interposed between them, said plates being located within the posts 15 and 16 and permanently secured in place.

Metal tightening bands 33 are connected at their front ends to the glass holding clips 25 and extend underneath the top glass plate 24 to the upper ends of the posts 15 and 16, at their rear ends having a fixed connection to the upper ends of bars 34 (Fig. 5) which extend lengthwise of the posts 15 and 16 are beveled at their lower edges to have a limited rocking movement and which are adjustable by means of screws 35, for imparting a pull or tension upon the bands 33 to snugly hold the several plates engaged by the slips 25 in proper and secure connection and relation with each other.

In Figs. 1 to 14 inclusive, a supporting structure for the show case which will take the place of the legs 6 and the plates 7 is disclosed, two of them being used in substantially the same positions occupied by said legs and plates. Such structure is of a better appearance, an adjustment is provided for leveling the show case, and within either of the supports the transformer previously mentioned may be mounted and housed and be readily accessible for examination, removal, repair and replacement.

In such structure a housing of sheet metal is provided with spaced vertical ends 36 and sides 37, at the upper end of which a horizontal plate 38 is secured which, in turn, is adapted to be connected to the tubes 1 by screws in the same manner as the plates 7 are connected. The hollow structure thus provided is open at the bottom. On each end 36 at the inner side thereof a vertical U-shaped bracket 39 is welded or otherwise permanently secured, screws 40 passing through the flanges thereof and bearing against the upper side of a lower end of a flanged closure plate is adjustable by operation of the screws 40 so that the show case may be leveled and properly located in horizontal position.

The side plates 37 have large rectangular openings therethrough, in which closure members 42 and 43, each having a vertical bottom and with sides extending inwardly therefrom flanged at their free edges are placed. One of said closure members, such as 43, may be secured in place or at least is not changeable in position in its use. The other closure member 42 at its inner side may be provided with straps 44 as shown in Fig. 13 to serve as a support for the transformer indicated in dash lines in Fig. 13. Its lower flange 45 which comes within the side 37 adjacent the lower edge of the opening therein at each end is provided with projections 46 (Fig. 12) so that said member 42 may be turned outwardly to the dash line position indicated in Fig. 11, without disconnecting and the transformer be thus made accessible for inspection, removal and the like. When turned to closing position, the member 42 is held frictionally against accidental movement.

The construction described is of a very practical, serviceable nature. The several tubes 1 and 9, the frame angle bars to which said tubes are connected and the channel bars 5 provide a light weight, but exceptionally strong and rigid frame structure which carries the weight of the show case and any contents therein without deformation. And the glass superstructure is held against change of position or any shucking of the plates at their adjacent edges with respect to each other, not only when in service but during all movings of the show case from one place in a store to another or from one store to another. The assembly and disassembly of the parts is very quickly and readily accomplished. The show case may be shipped in knockdown form and quickly assembled without the use of tools except a wrench and screw driver. There are no wood elements of structure used in practice. The bottom or floor of the show case at 21 may be of a translucent or opaque glass or the like though, of course, it is not limited to such material which might be of plywood or other suitable material without affecting the invention. And as such bottom or floor of the display compartment is free of connection to any of the other parts of the show case, a change in its form by warping or the like is not material in affecting the rigidity of the show case.

The invention is defined in the appended claims and is to be considered comprehensive of all forms of structure coming within their scope.

I claim:

1. In a structure as described, two spaced substantially parallel tubes, bars permanently connected at the ends of said tubes and located at right angles thereto, a third tube of greater length than the first tubes detachably connected with the rear end portions of said bars, and two additional spaced bars paralleling said tubes resting upon and connected to the first mentioned bars, said last mentioned bars being longer than the first mentioned tubes.

2. In a structure as described, two spaced generally parallel tubes, angle bars having horizontal legs and vertical legs extending downwardly therefrom located at the ends of said tubes and permanently secured by the vertical legs thereof to the tubes, said angle bars extending at their ends in front and back of said tubes, a third longer tube located back of the rearmost of the first tubes, bars permanently secured to said third tube extending forward along side the vertical legs of the first mentioned bars, means for detachably connecting the last mentioned bars to said vertical legs, additional bars resting upon the horizontal legs of the first mentioned bars in general parallelism with said tubes, one located in front of the front-most tube and the other between the remaining tubes, and means for connecting said additional bars to the horizontal flanges of the first bars.

3. A construction as defined in claim 1, and a lug permanently secured to said longer tube, one adjacent each end thereof, and angle bars having vertical and inwardly extending horizontal flanges connected with said lugs and extending forwardly therefrom, a front angle bar between the front ends of said end angle bars connected therewith and resting upon the forward end portions of the first mentioned bars, said front angle bar having a vertical flange and a rearwardly extending horizontal flange, and means for connecting said front angle bar to the front end portions of the first mentioned bars.

4. In a structure as described, a horizontal frame comprising, spaced generally parallel tubes, bars substantially at right angles thereto at the ends of the tubes permanently connected therewith and extending beyond the tubes at each end, a third longer tube detachably connected to said bars at their rear ends, and angle bars connected, one to the rear tube adjacent each end thereof extending forwardly therefrom, and a front angle bar extending between the front ends of said angle bars and permanently connected therewith.

5. A structure as defined in claim 4, and hollow vertical end posts permanently connected to said longer tube, one at each end thereof extending upwardly therefrom, channels connected to and extending lengthwise of said longer tube at their upper side having open upper sides for the reception of the lower edges of sliding doors, and like channels having open lower sides extending between said posts and connected therewith at their ends to the upper ends of the posts.

6. In a construction as described, a metal frame including two spaced generally parallel horizontal rods, bars at right angles to said rods permanently secured thereto, a third rod longer than the first mentioned rods rearwardly spaced from the rearmost of the first mentioned rods, means detachably connecting said last mentioned rod with said bars, end glass supporting bars detachably connected to said last mentioned rod and extending forwardly therefrom, a front glass supporting bar extending between the front ends of the end glass supporting bars permanently connected therewith and detachably connected to the first mentioned bars, vertical posts permanently connected to and extending upwardly, one at each end of said third rod, and upper and lower sliding door carrying means, said upper means extending between and connected at its ends to the upper ends of the posts and the lower carrying means lying against the upper side of the third rod and permanently secured thereto and extending between the lower ends of the posts.

7. In a structure as described, a horizontal frame including spaced front and rear tubes generally parallel to each other, bars generally at right angles to said tubes at the ends thereof permanently secured to the tubes, a third tube spaced back of the rearmost of the first tubes of greater length than said first mentioned tubes, means at the rear ends of said bars for receiving and supporting said longer tube, means for detachably connecting said longer tube to the rear ends of said bars, glass supporting bars detachably connected, one at each end of and extending forward from said third longer tube, additional longitudinal bars located and resting upon the first mentioned bars in substantial parallelism with said tubes and of a length shorter than the third tube and greater than the first two tubes, means for detachably connecting said additional bars to the first mentioned bars, a front glass supporting bar permanently secured to the front ends of the end glass supporting bars, and means for detachably connecting said front glass supporting bar to the first mentioned bars at the front end portions thereof.

8. A construction as defined in claim 7, and two plates extending between and under said two first mentioned tubes, one adjacent each end thereof, means detachably connecting said plates to the tubes, and supports permanently connected to said plates extending downwardly therefrom.

9. A frame construction for a show case comprising, a lower horizontal frame including longitudinal and transverse members permanently connected together, a back longitudinal lower frame member, means for detachably connecting said lower frame member to said transverse members, vertical end posts, one at each end of said lower longitudinal back member permanently connected thereto and extending upwardly, means extending between said posts adjacent their upper and lower ends and in fixed relation thereto adapted to receive and guide sliding doors, an end horizontal bar detachably connected at the front side and lower end of each of said posts extending forwardly therefrom, a front horizontal bar located between said end bars and connected at its ends to the ends thereof, means for detachably connecting said front bar to the transverse members, said posts, end bars and front bar having vertical end glass plates and a front glass plate associated therewith, the end plates being supported at their lower edges by said end bars and the front plate by said front bar, and said vertical posts at their front sides having vertical grooves receiving the rear vertical edges of said end plates.

10. A construction as defined in claim 9, and longitudinal bars mounted on and above the transverse members of said lower frame, means for connecting said longitudinal bars to said transverse members, said longitudinal bars at their upper sides lying in substantially the same plane and adapted to have a floor for the show case supported thereon.

11. A construction as defined in claim 9, and a generally vertical bar extending lengthwise of each of said posts each rockably mounted at its lower end on said lower back frame horizontal member, means for manually adjusting each of said vertical bars independently to different forward and rear positions at their upper end portions, and an elongated tape connected to the upper end of each of said vertical bars extending forwardly and connected to a bracket adapted to engage the top, end and front glass plates at their front corners, as specified.

12. In a show case structure, a lower horizontal supporting frame comprising, longitudinal and transverse members permanently secured together, a vertical back door carrying frame including upper and lower horizontal longitudinal members and vertical end posts permanently secured together, means for detachably connecting the lower horizontal member of said back frame to the transverse members of said horizontal frame, means detachably connecting a frame comprising horizontal end and front bars adapted to support end and front vertical glass plates to said posts and the front end portions of the transverse members of said horizontal frame, two horizontal plates detachably connected to said bottom frame one adjacent each end thereof, vertical supporting structures having spaced vertical sides and ends secured to and depending from said plates, and a support for an electrical transformer mounted at one of said vertical sides for movement from an open to a closed position, said side having an opening for the passage of the transformer therethrough when said support is in closed position.

13. In a display case construction, an elongated horizontal tubular member located at the rear portion and below the case and extending substantially the full length thereof, an open vertical frame including vertical end posts and horizontal upper and lower sliding door carrying guides permanently secured to said tubular member, end angle bars having horizontal and vertical flanges detachably connected, one at the lower end of each of said posts and extending forwardly therefrom, horizontal bottom supporting means connected to said tubular member intermediate its ends and extending forwardly therefrom, and a front angle bar having horizontal and vertical flanges connected to the front end portions of said last mentioned means and to the front ends of the end bars, said end and front angle bars having their horizontal flanges extending inwardly from their vertical flanges, said end and front angle bars being adapted to have front and end vertical walls of the display case rest at their lower edges thereon and within the vertical flanges thereof.

ANTHONY VANDERVELD.

REFERENCES CITED

The following references are of record in the file of this patent:

UNITED STATES PATENTS

| Number | Name | Date |
|---|---|---|
| 578,019 | Mistrot | Mar. 2, 1897 |
| 845,652 | LaBerge | Feb. 26, 1907 |
| 1,437,195 | Rasmussen | Nov. 28, 1922 |